Figure 1:
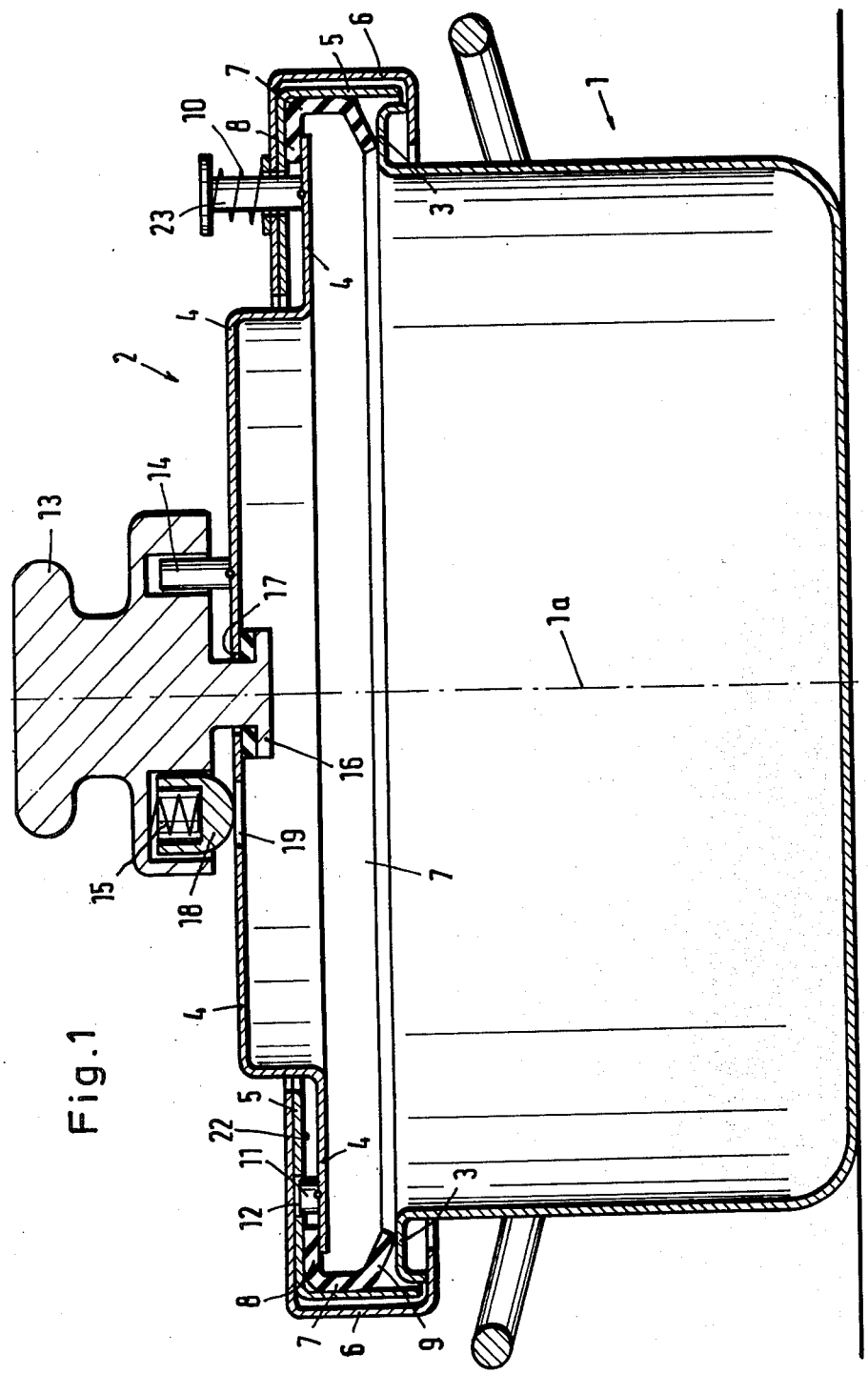

United States Patent [19]

Boehm

[11] Patent Number: 4,470,515
[45] Date of Patent: Sep. 11, 1984

[54] STEAM PRESSURE COOKER FASTENING MEANS

[76] Inventor: Hans G. Boehm, Kellergrundweg 13, D-6242 Kronberg/Ts., Fed. Rep. of Germany

[21] Appl. No.: 525,215

[22] Filed: Aug. 22, 1983

[30] Foreign Application Priority Data

Sep. 4, 1982 [DE] Fed. Rep. of Germany ....... 3232907

[51] Int. Cl.³ ............................................ B65D 45/00
[52] U.S. Cl. .................................. 220/316; 220/315; 292/256.6
[58] Field of Search ............... 220/293, 315, 316, 319, 220/320; 292/256.6

[56] References Cited

U.S. PATENT DOCUMENTS

| 4,024,982 | 5/1977 | Schultz | 220/293 |
| 4,352,439 | 10/1982 | Makhijani | 220/316 |
| 4,424,915 | 1/1984 | Horn | 220/316 |

Primary Examiner—George T. Hall
Attorney, Agent, or Firm—Wood, Herron & Evans

[57] ABSTRACT

A steam pressure cooker has a—readily exchangeable—cooking goods container with a uniformly extending rim and a divided lid. The one lid component is a central hood surrounded by a concentric frame down underneath which extends the hood, making contact with the lip of a profiled gasket which is arranged between the lid and the cooking goods container. Besides, the hood and the frame of the lid form the operating device for the locking mechanism of the steam pressure cooker.

11 Claims, 4 Drawing Figures

STEAM PRESSURE COOKER FASTENING MEANS

The invention concerns a steam pressure cooker consisting of an open-top cooking goods container with a rim surrounding the opening and extending around it uniformly, with a lid which can be placed with its rim on the container rim and features a safety valve as well as a locking mechanism whose locking members, forcing the rims of container and lid onto each other in the closing position, are jointly adjustable between an open position and a closed position by an operating device which is centrally arranged and movable relative to the lid.

Such a "Papin's Pot" is previously known from the German patent application No. 33 658: its circular lid supports on its topside a plate which concentrically surrounds a valve and to which there are hinged essentially radially outwardly extending rod type locking members which through rotation of the plate with the aid of a handle, which as well extends radially outward, can be moved into eyes attached to the container or out of them. On their free ends with which they enter the eyes, the locking members are tapered so that the desired and necessary pressure between lid and container occurs as the cooker is sealed. A specific gasket is not provided between the container and the lid.

In the following decades, many improvements to steam pressure cookers have been suggested, which primarily aimed at greater safety and simpler operation. In addition, allowance was to be made for the desire not to have the cooking goods container, that is, the actual pot or "lower pot", not appear as part of a steam pressure cooker when the lid is removed. But it has been found that these various demands and desires could not be allowed for at the same time, let alone at a corresponding degree.

From the German utility patent No. 77 15 930 there is a steam pressure cooker known whose cooking goods container requires for anchoring of the locking mechanism only a rim which is outwardly beaded but smooth on the peripherally extending top, which rim does not make it recognizable as a component of a steam pressure cooker; also, various cooking goods containers, specifically of different sizes, can be combined with the same lid. Disadvantageous is, however, that the locking mechanism consists of a clamping closure which is independent from the lid and has the shape of a divided ring. In addition, its handling is laborious and not without danger, because a complete release of the original pressure in the cooker interior is not assured as the clamping closure is opened.

While the clamping closure according to the German patent publication No. 25 34 709, ring-shaped as well, can be handled more easily and does not use a component which is separate from the lid and thus losable, it has the disadvantage of requiring a specific shape of the cooking goods container rim, which is cumbersome and expensive to manufacture as well. Moreover, the necessarily sideways emplacement and removal of the lid (while the semicircular closure is opened) runs counter to the demand for a simple and logical operability. Furthermore, hazards through sideways escaping steam are again not precluded when removing the lid.

As compared to this and similar state of the art, the problem underlying the invention is to improve a steam pressure cooker of the initially explained type to the effect that its operation will be simple and safe.

This problem is inventionally solved in that the lid consists of a central hood which operates the locking members and of a frame which concentrically surrounds the hood and is sealed relative to the container with the aid of a profiled gasket known as such, with the hood extending underneath the frame, overlapping it and making contact with a gasket which is held on the underside of the frame. The two concentric lid components form thus together with the gasket a valve which can be opened through applying pressure on the hood (against a pressure in the cooker interior). The relatively large circumference of this valve permits a swift release of interior pressure. On the other hand, already a relatively low internal pressure keeps the valve safely closed, due to the large hood surface area.

Inventionally split, the lid assumes thus additional functions in that, for one, the hood forming the largest part of the lid operates likewise the locking members and, for another, in that it forms together with the gasket frame a steam release valve. Moreover, the operating device for the locking members is practically blocked as long as a pressure exists in the interior space, because the large hood surface facing toward the pressure produces a correspondingly large friction force between hood and profiled gasket lip, thereby making a hood rotation under pressure just about impossible. Opening the cooker while under pressure, which would have fatal consequences, is thus prevented.

The seal between hood and frame is preferably a lip of the profiled gasket.

Profiled gaskets between lid and cooking goods container are variously known as such; compare for instance the previously mentioned German patent publication No. 25 34 709 or the German patent disclosure No. 28 01 173. However, new is not only its use in connection with a steam pressure cooker of the initially mentioned type, but also the inventionally releasable clamping of a profiled gasket section.

Cooking goods container and/or lids will frequently be circular, but this is not necessary; possible are also oval, rectangular or quadratic pot designs. It is not necessary either that the relative movement between hood and frame for operation of the locking members—as according to the German patent document No. 33 658—is a rotary movement (around the center axis). Also sideways longitudinal movements or specifically a vertical shift movement (so to speak in conjunction with opening the pressure release valve) may as well be provided for operation of the locking members.

In the case of a circular pot cross section, however, the hood will have a circular design and the frame will be ring-shaped, with hood and frame then being rotatable relative to each other around the center axis.

To make sure that the hood rim section overlapping the frame will also at an unpressurized interior space be in sealing contact with the profiled gasket lip, prestress devices are favorably provided which force the hood into contact with the profiled gasket lip.

According to an advancement of the invention, the arrangement is such that between the hood and the frame there is at least one locking member provided which only in the closed position of the locking members will permit the hood to bear on the lip while in any other position of the locking members it holds the hood spaced from the profiled gasket lip. This ensures that the pressure compensation [valve] between hood and frame remains open until the lid is completely latched to the cooking goods container. Moreover, this measure results in a further reduction of the danger that the lid lock may be opened before any pressure inside the cooker has been completely released.

Another favorable advancement is constituted by the fact that the operating device (for the locking members) features a nonrotatable, but vertically shiftable central handle which is held on the hood and that a handle extension forms together with the hood a steam release valve which is prestressed in closed position and can be opened through shifting of the handle. This handle makes it possible to easily move a hood both downward and rotate it relative to the frame. The steam release valve formed between the handle and the hood, so to speak, precedes the pressure compensation valve formed between the hood and the frame as mentioned above. Its area facing toward the inside pressure being of necessity considerably smaller than the inside area of the hood, it can be opened at a smaller expense of force than the large circular valve between hood and frame.

Before the handle can be moved in the sense of a rotary movement for the locking members, the steam release valve formed between the hood and the handle is opened first by pushing down on the handle, whereafter the hood—with the internal pressure sufficiently reduced—permits an easy movement into its opening position relative to the frame, requiring only the maintenance of pressure on the handle. The locking mechanism can then be opened, for instance through rotating the handle and, thus, the hood.

When the steam pressure cooker is equipped with locking members which are mounted on the lid and evenly distributed on the lid circumference, as previously known also from the German patent document 33 658, the locking members are preferably clamps which in the closed position clasp around the outwardly beaded container rim, which is smooth on the topside, and around the lid rim but release them in the opening position. This enables under retention of all safety and operating advantages a rim design for the cooking goods container which makes it readily usable as a serving utensile. Moreover, one and the same lid can be combined with various cooking goods containers with particular ease.

Figure 2:
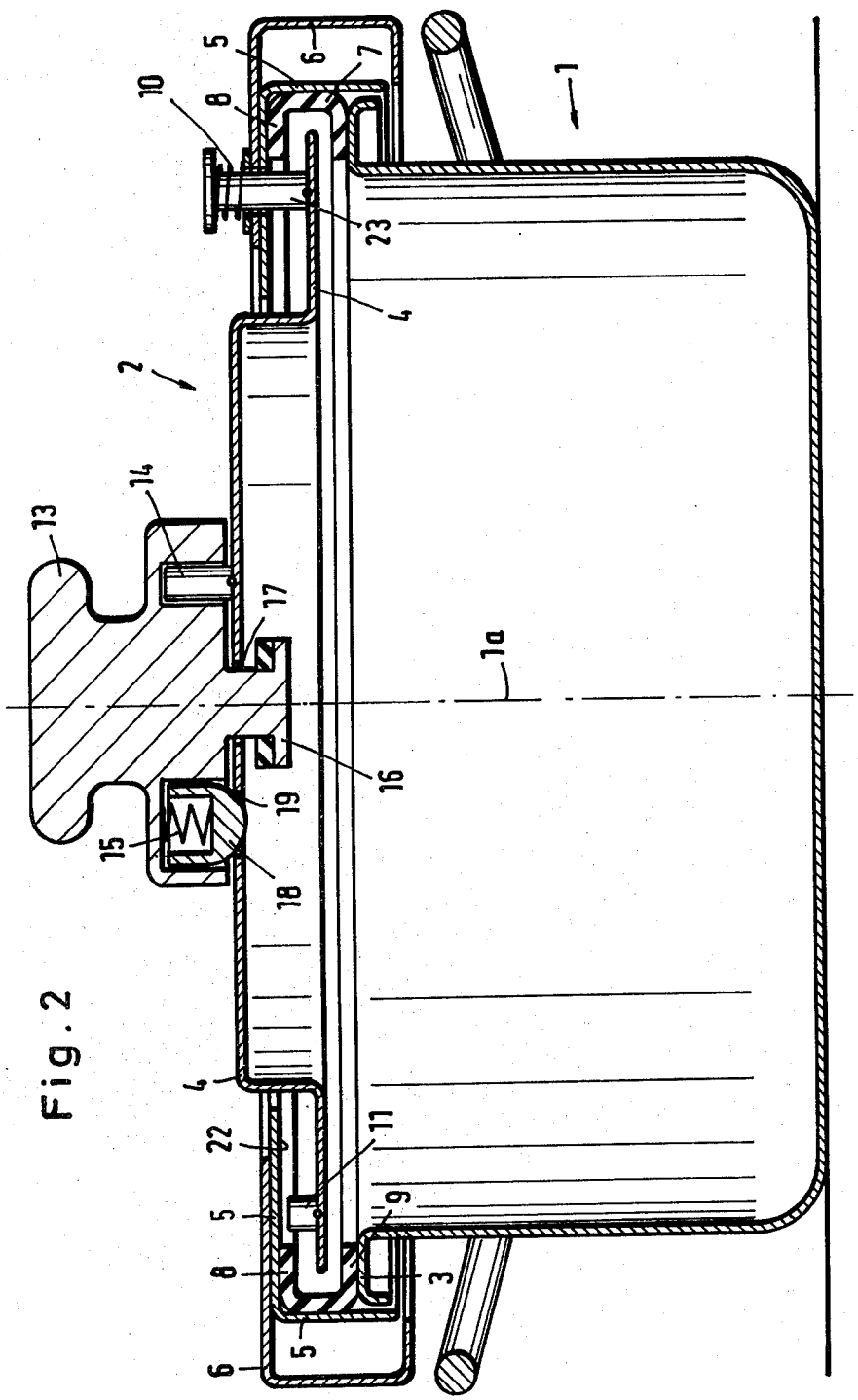
Figure 3:
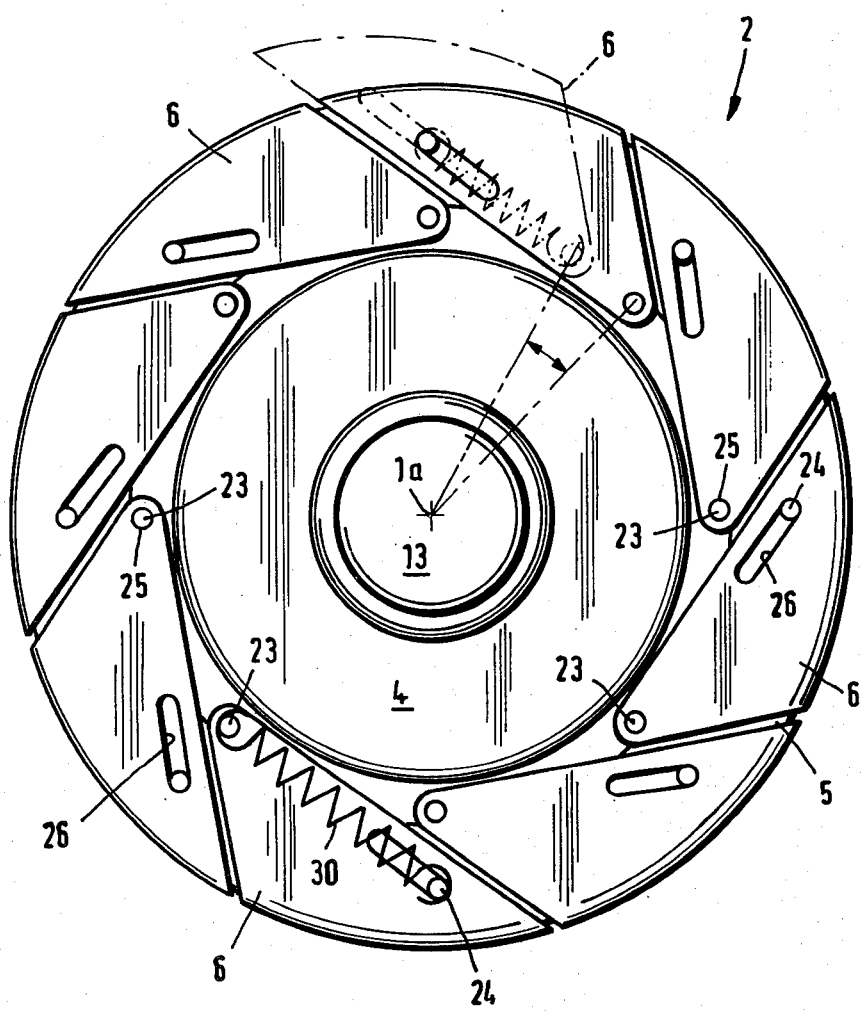
Figure 4:
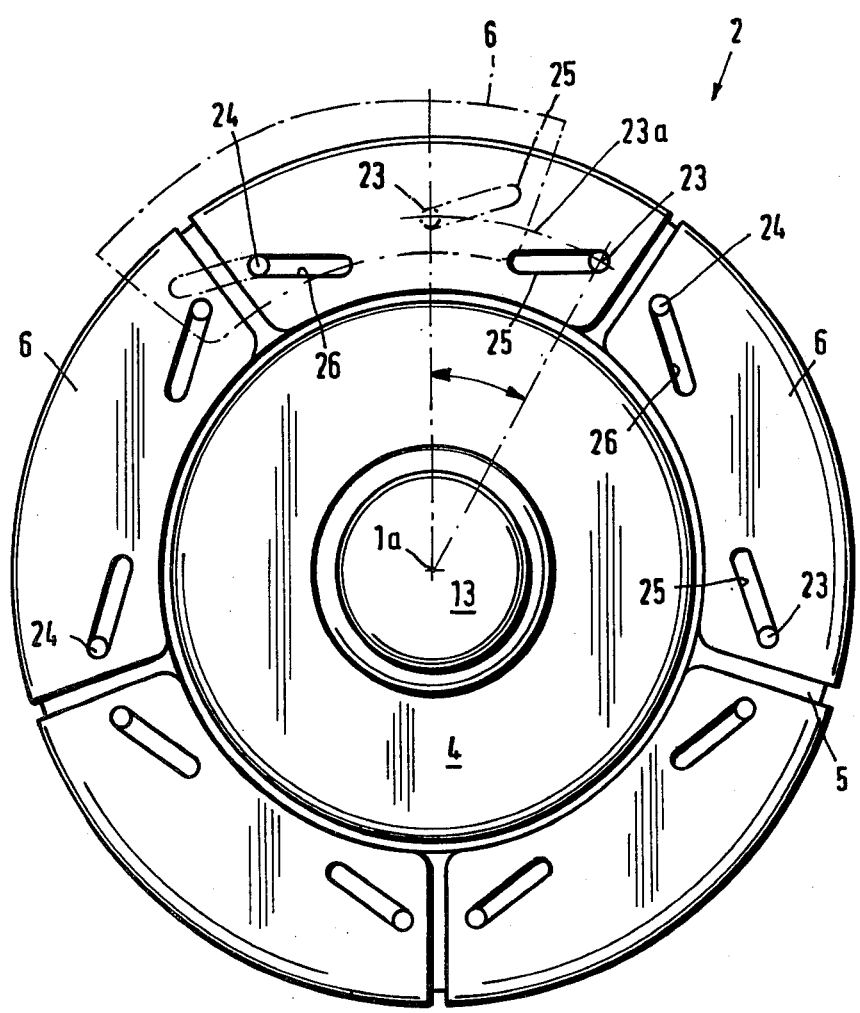

The drawing illustrates the invention on embodiments, showing in:

FIG. 1, a closed and locked steam pressure cooker in cross section;

FIG. 2, the same cooker opened;

FIG. 3, a plan view of a somewhat differently designed embodiment of the steam pressure cooker; and FIG. 4, a plan view corresponding to FIG. 3, of a modified embodiment of the locking mechanism.

The steam pressure cooker consists of a cooking goods container 1 and the lid marked 2 in its entirety. The container 1 has an outwardly beaded, peripherally uniform rim 3 which is smooth at the top.

The lid 2 is divided and consists essentially of a hood 4, presently circular, and a frame 5 which is concentric with it and extends in overlapping fashion underneath the hood. Arranged in the area of the frame 5, on the lid 2 and evenly distributed on its circumference, are several clamps 6 which in the locked position clamp around the frame 5 and the container rim 3.

Arranged between the frame 5 and the container rim 3 is a profiled gasket 7 in a fashion such that it will be held on the underside of the cross-sectionally angular frame 5. The upper sealing lip 8 of the profiled gasket 7 is located between the horizontal shank of the frame 5 and the rim area of the hood 4 extending underneath the frame 5. The lower sealing lip 9 of the profiled gasket 7 rests with its free end elastically on the container rim 3. Distributed on the lid circumference, force accumulators in the form of springs 10 pull the hood 4 onto the sealing lip 8 and prestress in this way the hood 4 and the frame 5 relative to each other. FIGS. 1 and 2 show only one of the springs 10.

Fastened in the overlap area between the hood 4 and the frame 5 on the hood 4, is at least one blocking member 11 in the form of an upward-extending pin which in the closed position of the clamps 6 can enter a bore 12 provided in the frame 5 and then, for one, will block a rotation of the hood 4 relative to the frame 5 (thereby making an opening of the locking clamps 6 impossible, as will yet be described) and, for another, will permit a rim area of the hood 4 to make contact with the lip 8 of the profiled gasket 7. But when moving the blocking member 11 through vertical pressure down on the hood 4 out of the bore 12 and then rotating the hood relative to the frame 5 (whereby the clamps 6 will be moved into the opening position of the locking mechanism), the blocking member 11 will strike with its top end on the underside of the frame 5 and hold the hood 4 spaced from the lip 8 of the profiled gasket 7.

Centrically to the center axis 1a, i.e., in the center of the hood 4, a knob type handle 13 is arranged on the hood. Fastened eccentrically to the hood 4, a pin 14 extends into a corresponding blind hole of the handle 13, upward from below, and prevents a rotation of the handle 13 relative to the hood 4, but permits a vertical movement of the handle 13 relative to the hood 4 to the extent permitted by an extension 16 through a bore 17 in the hood 4. The extension 16 of the handle 13 forms with the hood 4, through the intermediary of a suitable gasket, a pressure release valve which can be opened by pushing down on the handle 13.

Arranged as well eccentrically to the center axis 1a, in a blind hole in the handle 13, is the valve body 18 of a safety valve which together with a bore 19 in the hood 4 forms the safety valve. A spring 15 prestresses the valve body 18 in closed position (FIG. 1 shows the open position which the safety valve 18, 19 assumes when releasing steam). The reactive force of the spring 15 forcing the valve body 18 on the opening 19 forces the handle 13 upward and represents as well the closing prestress of the release valve 16.

FIGS. 3 and 4 show various embodiments of the locking mechanism on a steam pressure cooker illustrated at reduced scale and somewhat modified in its design; but identical and/or corresponding components are marked using the same designators as in FIGS. 1 and 2.

According to FIG. 3, the clamps 6 are in plan view approximately triangular and mounted rotatably near a corner point on a pin 23 which is fastened to the hood 4; for that purpose, bores 25 are provided in the clamps 6. The pins 23 may likewise serve as supports for the springs 10 (FIGS. 1, 2). Fastened on the frame 5 are pins 24 (not illustrated in FIGS. 1, 2) which engage longitudinal slots 26 in the clamps 6, the slots extending at an angle to the circle passing through the pins 24 and to the center axis 1a.

Illustrated in FIG. 3 is the closing position of the locking mechanism. As the hood 4 is rotated relative to the frame 5 in the direction of the arrow "open" around the center axis 1a, the clamps 6—as indicated on the example of a clamp by a broken line—are entrained and swung outward into an opening position (around the pins 23) in accordance with the above-mentioned angular position of the longitudinal slots 26, in which opening position the correspondingly shaped lower shanks 6a of the clamps 6 on the rim 3 will no longer clamp around under the container 1. Springs 30 prestress the clamps 6 in their opening position and support thus the opening operation; in the closed position, the springs 30 remain stressed (FIG. 1) through the blocking action of the blocking members 11 which have entered the bores 12.

The locking mechanism of the clamps 6 relative to FIG. 4 differs from the one described before in that the clamps 6 will in the opening process not perform a swing movement but move radially outward. Superimposed on this movement, however, the same as with the embodiment relative to FIG. 3, is also a circular swivel movement around the center axis 1a. The pins 23 are again attached to the hood 4, and the pins 24 to the frame 5. The pin 24 engages again a longitudinal slot 26 with which there is symmetrically coordinated a longitudinal slot 25a in the clamp 6 which is engaged by the pin 23. The pins 24 and 25 being located at an equal radial distance from the center axis 1a, the pin 23 attached to the hood 4 engages the frame 5 in which, therefore, a longitudinal slot across the circular arc 23a must be provided. Otherwise, the function and operation of the locking mechanism illustrated in FIG. 4 corresponds with that of the embodiment relative to FIG. 3.

Operationally, the opening of the steam pressure cooker out of the closed position illustrated in FIG. 1 (but with the safety valve 18, 19 closed) into the opening position shown in FIG. 2 proceeds as follows:

Vertical pressure applied down on the handle 13 causes the steam release valve to open against the force of the spring 15 because the extension 16 of the handle 13 opens into the pot interior, releasing the bore 17. As soon as the internal pressure has been reduced to a slight residual pressure, the hood 4 can be pushed down relative to the frame 5 and against the force of the springs 10 (through continued pressure on the handle 13). The hood 4 separates thereby from the upper sealing lip 8, permitting residual steam to escape through the annular gap 20 which is thus created. The profiled gasket 7 is in this process elastically deformed in the area of the lower sealing lip 9, the lower shanks 6a of the U-shaped clamps 6 separate from the rim 3 of the container 1; an annular gap 21 (FIG. 2) is being created.

Continued pressure on the handle 13, and thus on the hood 4, permits the blocking members 11 to leave the bores 12 in the frame 5. As soon as the blocking members 11 drop with their surface below the inside surface 22 of the frame 5, the hood 4 can be rotated relative to the frame 5. The clamps 6 move then simultaneously essentially radially outward, separating with their lower shanks 6a from the rim 3 of the container 1. The lid can now be removed.

As the pressure on the hood 4 and the handle 13 is reduced, the blocking members 11 make contact with the area 22 of the frame 5, from below, and keep the annular gap 20 open. The hood 4 can again make contact with the sealing lip 8 of the profiled gasket only when in a subsequent closing and locking operation the blocking members 11 (after the clamps 6 have been moved into their closing position) have come in alignment with the bores 12 through opposite rotation of the hood 4 relative to the frame 5. As long as this does not occur, pressure cannot build up inside the cooker even at a high energy supply.

I claim:

1. Steam pressure cooker consisting of an open-top cooking goods container with a rim surrounding the opening and extending around it uniformly, with a lid which with its rim can be placed on the container rim and comprises a safety valve and a closing mechanism whose locking members, forcing the rims of container and lid onto each other in locking condition, can be jointly adjusted between an opening position and a closing position with the aid of an operating device which is movable relative to the lid, characterized in that the lid (2) consists of a center hood (4) and, surrounding it concentrically, a frame (5) which relative to the container (1) is sealed with the aid of a profiled gasket (7) known as such, with the hood (4) engaging the frame (5) in overlapping fashion and bearing on a gasket which is held on the underside of the frame (5).

2. Steam pressure cooker according to claim 1, characterized in that the gasket between hood (4) and frame (5) is a lip (8) of the profiled gasket (7).

3. Steam pressure cooker according to claim 1 or 2 with a circular cross section, characterized in that the hood (4) and the frame (5) are of a circular design, and in that the hood and the frame can be rotated relative to each other around the center axis (1a).

4. Steam pressure cooker according to claim 2 or 3, characterized in that prestressing devices (10) force the hood (4) in contact with the lip (8) of the profiled gasket (7).

5. Steam pressure cooker according to claim 4, characterized in that between the hood (4) and the frame (5) there is provided at least one blocking member which only in the locked position of the locking members (6) will permit the hood (4) to bear on the lip (8) while in any other position of the locking members it holds the hood spaced from the lip of the profiled gasket.

6. Steam pressure cooker according to claim 5, characterized in that the locking member (11) consists of a pin which at the top is fastened to the hood and can in the locked position of the locking members (6) enter a bore (12) in the frame (5).

7. Steam pressure cooker according to at least one of the preceding claims, characterized in that the frame (5) has an angular cross section and, along its cross part and its lip (8) forming the upper shank, fits around the profiled gasket (7), which has the shape of a U that is open toward the center axis (1a), while the lower shank forms a lip (9) and bears with its free end flexibly on the rim (3) of the container (1).

8. Steam pressure cooker according to at least one of the preceding claims, characterized in that the operating device features a nonrotatable but vertically shiftable central handle (13) which is held on the hood (4), and in that an extension (16) on the handle forms with the hood (4) a steam relief valve which is prestressed in closed position and can be opened by shifting the handle.

9. Steam pressure cooker according to claim 8, characterized in that between the handle (13) and the hood (4) there is also provided a safety valve (18, 19) whose prestress into closing position represents likewise the prestress of the relief valve.

10. Steam pressure cooker according to claim 1 or one of the following claims, with locking members which are movably mounted on the lid and evenly distributed over the lid circumference, characterized in that the locking members (6) consist of clamps which in the closed position clasp around the outwardly beaded, smooth-top container rim and the rim of the lid while in the opening position releasing them.

11. Steam pressure cooker according to claim 10, characterized in that the clamps (6) are movably mounted on the hood (4) with their upper shanks (pin 23), and in that control cams (24) fastened to the frame (5) engage guide slots (26) which move the clamps (6) outward as the hood (4) and the frame (5) move relative to each other.

* * * * *